PAGING RECEIVER HAVING CYCLING MASS

Original Filed Oct. 11, 1968 2 Sheets-Sheet 1

SHOLLY KAGAN
Inventor
By Alfred H. Rosen
Frank A. Steinfelder
Attorneys

PAGING RECEIVER HAVING CYCLING MASS

Original Filed Oct. 11, 1968 2 Sheets-Sheet 2

SHOLLY KAGAN
Inventor
By
Attorneys

United States Patent Office

Re. 28,213
Reissued Oct. 29, 1974

28,213

PAGING RECEIVER HAVING CYCLING MASS

Sholly Kagan, East Natick, Mass., assignor to Bell & Howell Company, Chicago, Ill.

Original No. 3,623,064, dated Nov. 23, 1971, Ser. No. 766,781, Oct. 11, 1968. Application for reissue Aug. 15, 1973, Ser. No. 388,456

Int. Cl. G08b 7/00

U.S. Cl. 340—311 15 Claims

Matter enclosed in heavy brackets [ ] appears in the original patent but forms no part of this reissue specification; matter printed in italics indicates the additions made by reissue.

ABSTRACT OF THE DISCLOSURE

A personal paging device has a call signal receiver which generates when activated a train of [regularly spaced] electrical pulses controlling an electric vibrator. The vibrator comprises an electric motor which receives the pulse train and [periodically] accelerates a cyclicly mounted mass to produce, as a result of the reaction forces developed, tactually sensible reaction vibrations in the device. In a primary embodiment the mass is eccentrically mounted so as to additionally produce tactually sensible variations at frequencies which are distinguishable from the said reaction vibrations.

BACKGROUND OF THE INVENTION

This invention relates to radio-operated alerting devices, and more particularly to paging receivers of the kind which can be carried on the person of a user. Customarily, such receivers are small enough to fit into a shirt pocket, or to be clipped to the belt holding up a person's trousers.

Paging receivers are now in use employing an audible alerting signal. This has disadvantages when the user wants to avoid alerting or disturbing other persons. Substitution or addition of a visual alerting signal (e.g. a flashing light) does not entirely solve the problem, for the attention of the user cannot always be assured, nor can the user be certain to avoid alerting other persons. The present invention solves the problem with a silent and invisible vibratory alerting device, which has unique advantages not afforded by audible or visible alerting signals.

According to the present invention a rigid supporting structure, which contains or supports means (e.g. radio receiver) to receive a calling signal and means (e.g. decoder and alerting signal generator) to provide an alerting signal, has affixed to it normally inactive vibrator means for vibrating the structure at a frequency in the subaudible range (e.g. 5 c.p.s. and employs the alerting signal to activate the vibrator means. When the vibrator means is activated the entire structure is set into forced vibration at the subaudible frequency and if it is being carried on the person of a user only the user feels the vibration and, therefore, only the user is alerted to the calling signal.

A feature of the invention is that the alerting signal may be in the form of one or more pulses of energy, whereby to accelerate the vibrator means from an inactive state to an active state in a time interval which is short relative to the time required for the vibrator to return to the inactive state. A series of such pulses of energy, temporally spaced apart greater than the pulse duration, causes the alerting device to throb in an attention-commanding manner. If the device rests on the surface of a hard, flat body, such as a table or a desk, the device executes a walking motion across the surface while so throbbing, and simultaneously causes a corresponding throbbing noise by its vibration against the hard surface. Thus, when the device is not worn by its user, it can be employed to give a signal which is both audible and visible simply by placing it on a hard, flat surface. If placed in a confining saucer or ash tray, its vibration against the latter will cause a pronounced throbbing noise while it may or may not be free to move depending upon the nature of its confinement.

Several embodiments of the invention are described in this specification, illustrating a variety of preferred ways to practice the invention. The description, which follows, refers to the accompanying drawings, in which:

FIG. 1C shows an alternative location for the vibrator means;

Figure 4:
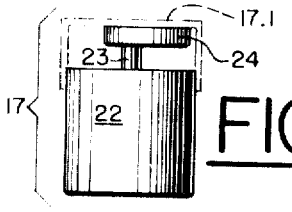
Figure 5:
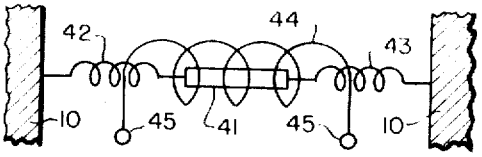
Figure 7:
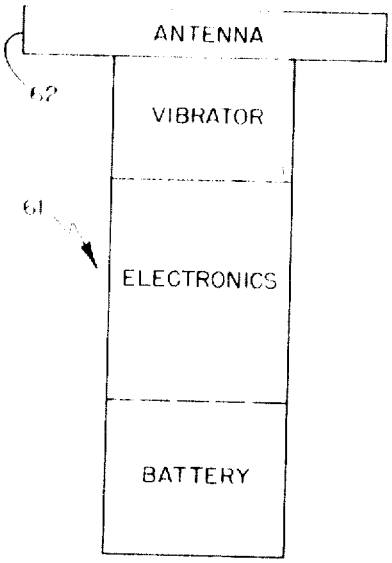
Figure 6:
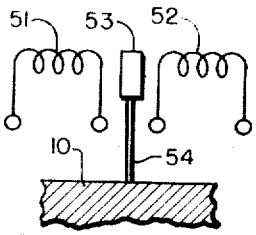

FIGS. 4, 5 and 6 schematically illustrate three different forms of vibrator means; and FIG. 7 schematically illustrates another arrangement of the parts in an alerting device according to the invention.

Figure 1:
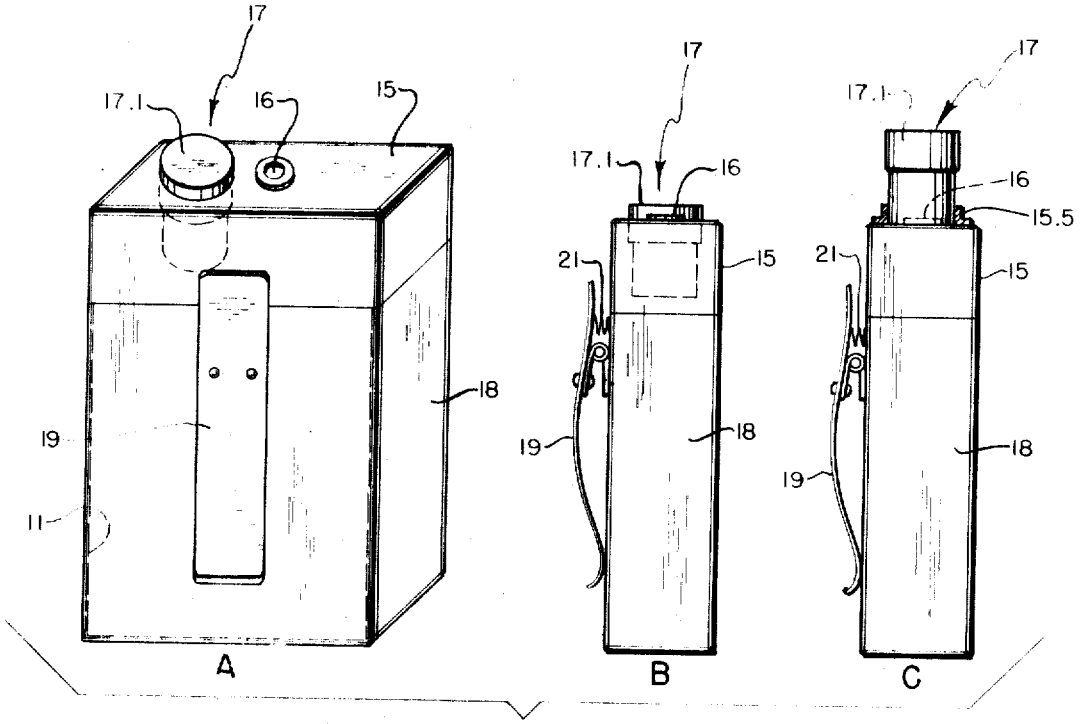
FIG. 1 shows two external views, A and B, of a paging receiver according to the invention.
Figure 2:
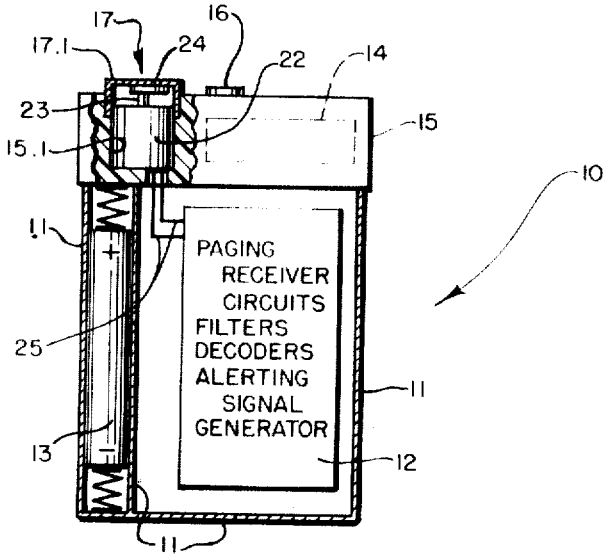
FIG. 2 is a schematic illustration showing the location of parts in FIG. 1.

Referring now to FIGS. 1A and B and FIG. 2, the alerting device is a paging receiver, comprising a rigid supporting structure 10 (FIG. 2) which supports within its framework 11 the prior art electronic and electromechanical components 12 which perform the radio receiver, filter and decoder, and alerting signal generator functions. Since these are prior art components, they will not be described Also supported in the structure 10 are a power source (i.e. battery) 13 and an antenna 14. The top part 15 of the structure 10 is also an outer part of the housing of the receiver, and contains a phone jack 16, and a vibrator means 17. As is shown in FIG. 1A and B, a cover 18 fits slidably over the framework 11 to enclose the parts 12, 13 supported in it, and completes the outer housing of the receiver. A clip 19 hinged to the cover 18 is spring-urged as by a spring 21 to hold the receiver in a pocket or to a belt (not shown).

The vibrator means 17 may, as shown in FIG. 2 and FIG. 4, comprise an electric motor 22 having a rotatable shaft 23 with an eccentrically mounted mass 24 on it. A cover 17.1 covers the mass 24, as it is shown in FIGS. 1A and B and FIG. 2. A pair of wires 25 carry the alerting signal from the alerting signal generator in the parts 12 to the motor 22. The motor is normally at rest; that is, inactive; and it is activated, that is, caused to spin the shaft 23, when the alerting signal is applied to it. When the motor is activated the mass 24 turns on the axis of the shaft 23 and, being eccentrically mounted on the shaft, causes the motor 22 to vibrate at a frequency determined by the speed of rotation. A low frequency, below audible, such as five cycles per second, is a preferred frequency of vibration. This can be felt quite readily. The motor 22 is rigidly engaged with the top part 15 of the structure 10; for example the top part may be of a plastics material and the motor 22 press-fitted into a bore 15.1 in the top part. The structure 10 is thereby forced into vibration at the same low frequency.

The same result can be achieved by affixing the vibrator means 17 to the outside of the supporting structure 10, as is shown in FIG. 1C. Here the vibrator means 17 is affixed to the top part 15, electrically connected to the alerting signal generator via the phone jack 16, and held in place by a locating and retaining collar 15.5 which is affixed to the top part 15 of the structure 10. The vibrator means 17 may thus be detachably attached to the structure 10.

Figure 3:
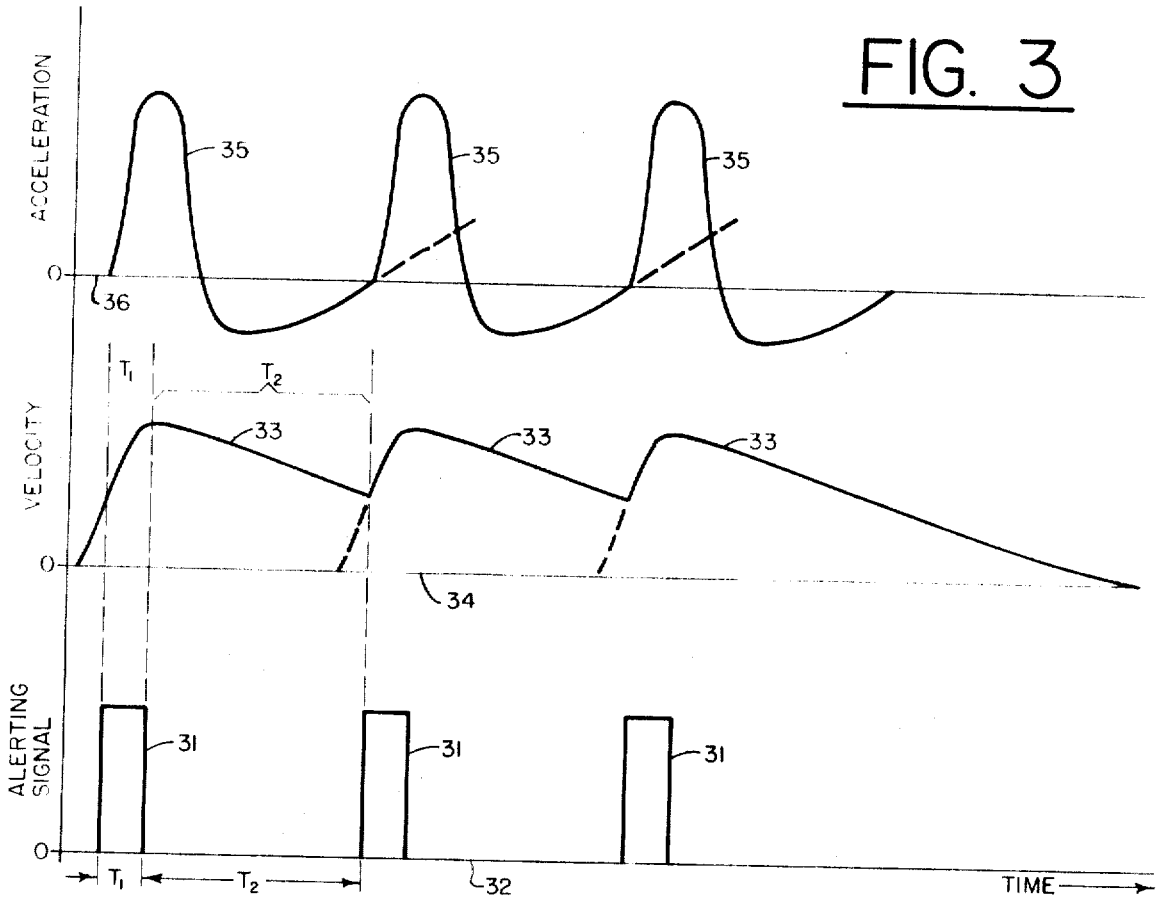
FIG. 3 is a set of graphs for explaining pulse operation of the invention.

The alerting signal may be a continuous electrical signal, DC or AC as desired, but advantages can be obtained if it is in the form of a train of pulses, as illustrated in FIG. 3. In addition to conserving battery power, a train of pulses causes the vibrator means to produce a throbbing form of vibration which is attention-commanding and has other advantages . FIG. 3 is a set of three graphs on a time axis. Three altering signal pulses 31 are shown in a train on the lower axis 32. Each pulse, when applied to the motor 22, causes it to accelerate its shaft 23 into rotation and, when the pulse terminates the shaft decelerates more slowly toward rest. Thus the rotational velocity increases rapidly and decreases slowly, as shown by curve 33 on the middle time axis 34. The acceleration is illustrated by curves 35 on the uppermost time axis 36. Each pulse 31 accelerates the vibrator means from an inactive state to an active state in a time interval $T_1$ which is short relative to the time $T_2$ required for the vibrator means to return to the inactive state after the pulse has ceased. If the pulse duration is about $T_1$ and the time interval between pulses is about $T_2$, then a characteristic throbbing vibration is produced. In addition to commanding attention by virtue of its unique character, this throbbing vibration causes the entire structure 10 to execute a walking like motion, due to the reaction forces developed on the supporting structure 10, when the paging receiver is resting on a hard flat surface. Thus, when the user removes the receiver from his or her person and sets it down on a hard flat surface, a paging signal will cause the receiver to produce a rattling noise in a series of pulses corresponding to the alerting signal pulses 31, and to move in a shuffling manner relative to the surface, the shuffles being stepwise at the frequency of the alerting-signal pulses. If the receiver is "standing," that is upright on the surface in the attitude of FIG. 1, it may actually appear to shuffle along in a straight or nearly straight line; if it is resting on its side, it may "shuffle" in a curved path.

The frequency of the pulses 31 is not to be confused with the frequency of vibration of the vibrator means 17. Each pulse 31 contains at least several cycles of vibration of the vibrator means 17, as will be apparent when it is realized that the motor shaft is preferably brought to rotation at its intended full speed in the time duration $T_1$ of each pulse 31, and then allowed to coast toward rest in the succeeding time interval $T_2$.

Alternative forms of the vibrator means 17 are shown in FIGS. 5 and 6. In FIG. 5 a mass 41 of magnetic material such as iron is suspended between two springs 42, 43 which are in turn anchored to the structure 10, and a hollow-core solenoid coil 44 surrounds the mass 41, which at rest may be located nearer to one end of the coil than to the other. The alerting signal (not shown) is applied to the coil 44, which may for this purpose be connected via terminals 45 to the wires 25 carrying the alerting signal. An appropriate alerting signal will set the mass 41 into vibration which will be coupled via the springs 42, 43 to the structure 10. The springs may be chosen to effect a coupling between the mass 41 and the structure 10 such that when a pulse-form alerting signal is used the mass 41 will continue to vibrate for a period of time ($T_2$) larger than the time ($T_1$) duration of the alerting-signal pulse. The alerting signal, whether continuous or in pulse form, may have a frequency corresponding to the resonance frequency of vibration of the mass 41 and its springs 42, 43, or it may be a DC pulse.

In FIG. 6 two coils 51 and 52 are located one on each side of a magnetic mass 53 which is mounted at one end of a spring 54, the other end of which is connected to the structure 10. An alerting signal may be connected to the coils 51, 52 to set the mass 53 into vibration and thereby cause the structure 10 to vibrate.

It will be apparent that the vibrator means shown in FIGS. 4, 5 and 6 have in common the property that each comprises a solid mass (24, 41, 53, respectively) motor means (22, 44 and 51, 52, respectively) to drive said mass cyclically in a prescribed path, and means linking the mass to the structure 10. Other vibrator means having these properties can be employed, if desired.

FIG. 7 represents an arrangement of an alerting device according to the invention in which the structure 61 can be in the shape of an elongated (e.g. tubular) body, which is convenient to carry in one's pocket, like a pencil or fountain pen. The structure 61 contains, along its axis, the battery, electronics and vibrator means, as the labels in FIG. 7 show, with the vibrator nearer one end of the elongated body than the other. The antenna 62 for receiving radiobroadcast calling signals, is affixed across one end of the structure 61, where it will be least apt to be covered by clothing material. With the vibrator at one end of an elongated body, a form of vibration which is transverse to the longitudinal axis of the elongated body can force the elongated body correspondingly into vibration transverse to its axis, which will be easily felt and visibly noticeable. If the vibrator means 17 shown in FIG. 4 is used with the shaft 23 parallel to the longitudinal axis of the elongated body, a nutating motion may be induced into the alerting device.

Referring again to FIG. 2, the vibrator means 17 need not be located near a corner or side of the structure 10. By rearranging the electronic parts, the vibrator means may be located at or near the geometric center of the structure thereby increasing the ability to cause an entire wide side of the alerting device to vibrate against the body of a user.

I claim:

1. A personal paging device comprising a supporting structure, sensing means carried by said structure and responsive to space-transmitted energy for providing an alerting signal comprising a train of regularly spaced electrical pulses, normally inactive vibrator means for vibrating said structure, said vibrator means including an eccentric mass supported for cyclic movement and electric motive means responsive to said alerting signal for driving said mass through a range of vibrational frequencies toward a steady-state frequency, each of said pulses in said alerting signal being of a length to endure for a period of time longer than a cycle of said [signal at said steady] *vibrator means at said steady* state frequency of vibrator.

2. A personal paging receiver intended to be carried on the clothing of a person, comprising a supporting structure, radio receiver means carried by said supporting structure for providing an alerting signal, a mass, means for constraining said mass to be movable cyclicly in a substantially linear path relative to said structure, electric motive means responsive to an alerting signal received from said radio receiver means for driving said mass in said path, and means coupling said mass to said structure for causing said structure to vibrate when said motive means is activated.

3. A personal paging device, comprising:

a casing;

sensing means disposed within said casing and being responsive to space-transmitted energy for developing an alerting signal in the form of a train of regularly spaced electrical pulses having a predetermined pulse frequency which is capable of being sensed tactually; and vibratory means within said casing and coupled thereto, comprising:

a mass supported for cyclic movement, and electric motive means responsive to an alerting signal developed by said sensing means for accelerating said mass periodically at said pulse frequency, the periodic acceleration of said mass by said motive means producing by reaction forces acting on said motive means tactually sensible vibration of said casing at a vibrational frequency which corresponds to said pulse frequency.

4. A device according to claim 3 wherein said electric motive means has rotor means including said mass which is accelerated periodically at said pulse frequency.

5. A device according to claim 3 wherein said mass is accelerated from an initial velocity in a time interval which is short relative to the time required for said mass to decelerate to the initial velocity after a pulse in said alerting signal has ceased.

6. A personal paging receiver, comprising:

a casing, sensing means disposed within said casing and being responsive to space-transmitted energy for developing an alerting signal in the form of a train of regularly spaced electrical pulses having a predetermined pulse frequency which is capable of being sensed tactually;

vibratory alerting means within said casing and coupled thereto, comprising:

a mass supported for cyclic movement, electric motive means responsive to an alerting signal developed by said sensing means for periodically accelerating said mass at said pulse frequency, the periodic acceleration of said mass by said motive means producing by reaction forces acting on said motive means tactually sensible vibration of said casing at a vibrational frequency which corresponds to said pulse frequency, said mass being in a state of imbalance so that when it is accelerated it produces readily sensible vibrations in said casing in a range of frequencies depending on its velocity, the frequencies in said range of frequencies being substantially above and tactually distinguishable from said vibrations of said pulse frequency.

7. A device according to claim 6 wherein said electric motive means is an electric motor having rotor means including said mass which is accelerated periodically at said pulse frequency.

8. A device according to claim 7 wherein said mass has an eccentric center of gravity to create said state of imbalance.

9. The apparatus defined by claim 2 wherein said electric motive means includes a solenoid coil for receiving said alerting signal, wherein said mass is composed of a ferromagnetic material and is disposed within said coil, and wherein said means for constraining said mass includes spring means interconnecting said mass and said supporting structure.

*10. A personal paging device comprising a supporting structure, sensing means carried by said structure and responsive to space-transmitted energy for providing an alerting signal comprising a train of electrical pulses, vibrator means coupled to said structure, said vibrator means comprising a mass supported for cyclic movement and electric motive means responsive to said alerting signal for accelerating said mass in response to each said pulse, the acceleration of said mass by said motive means producing by reaction forces acting on said supporting structure tactually-sensible vibration of said structure corresponding to said pulses.*

*11. A personal paging device according to claim 10 in which said mass is supported so that it can be accelerated through a range of frequencies of vibration and thereby produce additional tactually-sensible vibration of said supporting structure corresponding to said frequencies.*

*12. A personal paging device comprising a supporting structure, sensing means carried by said structure and responsive to space-transmitted energy for providing an alerting signal comprising a train of electrical pulses, vibrator means coupled to said structure, said vibrator means comprising a mass supported for cyclic movement and electric motive means responsive to said alerting signal for accelerating said mass through a range of vibrational frequencies toward a steady-state frequency in response to each said pulse, each said pulse being of a length to endure for a period of time longer than a cycle of said vibrator means at said steady state frequency, the acceleration of said mass by said motive means producing by reaction forces acting on said supporting structure tactually-sensible vibration of said structure corresponding to said pulses.*

*13. A personal paging device according to claim 10 wherein said alerting signal comprises a train of spaced electrical pulses.*

*14. A personal paging device according to claim 10 wherein said tactually-sensible vibration of said structure is synchronized with said electrical pulses.*

*15. A personal paging device comprising a supporting structure, sensing means carried by said structure and responsive to space-transmitted energy for providing an alerting signal comprising a train of electrical pulses, normally inactive vibrator means for vibrating said structure, said vibrator means including an eccentric mass supported for cyclic movement and electric motive means responsive to said alerting signal for driving said mass through a range of vibrational frequencies toward a steady-state frequency, each of said pulses in said alerting signal being of a length to endure for a period of time longer than a cycle of said vibrator means at said steady state frequency of vibration.*

References Cited

The following references, cited by the Examiner, are of record in the patented file of this patent or the original patent.

UNITED STATES PATENTS

| | | | |
|---|---|---|---|
| 2,127,468 | 8/1938 | Griebach | 340—407 |
| 2,566,409 | 9/1951 | Greene | 340—407 |
| 2,582,277 | 1/1952 | Powlison | 340—407 X |
| 2,827,621 | 3/1958 | Reichert | 340—407 X |
| 2,972,140 | 2/1961 | Hirsch | 340—407 |
| 2,817,080 | 12/1957 | Balduman | 340—400 X |
| 3,116,481 | 12/1963 | Kalin | 340—400 X |
| 2,191,516 | 2/1940 | Caldwell | 340—407 |

HAROLD I. PITTS, Primary Examiner

U.S. Cl. X.R.

340—399, 400, 407

PO-1050
(5/69)

UNITED STATES PATENT OFFICE
CERTIFICATE OF CORRECTION

Patent No. Re. 28,213 Dated Reissued Oct. 29, 1974

Inventor(s) Sholly Kagan

It is certified that error appears in the above-identified patent and that said Letters Patent are hereby corrected as shown below:

Column 4, line 40, delete "vibrator" and insert --vibration--

Signed and sealed this 3rd day of June 1975.

(SEAL)
Attest:

RUTH C. MASON
Attesting Officer

C. MARSHALL DANN
Commissioner of Patents
and Trademarks